United States Patent Office 3,657,222
Patented Apr. 18, 1972

3,657,222
PHENETHYL TRIAZEPINE COMPOUND
Stanley J. Strycker, Midland, Mich., assignor to The Dow Chemical Company, Midland, Mich.
No Drawing. Continuation-in-part of application Ser. No. 602,597, Dec. 19, 1966. This application Dec. 17, 1969, Ser. No. 885,967
Int. Cl. C07d 55/54
U.S. Cl. 260—239 BC       5 Claims

ABSTRACT OF THE DISCLOSURE

The present invention is directed to a phenethyl triazepine compound of the formula

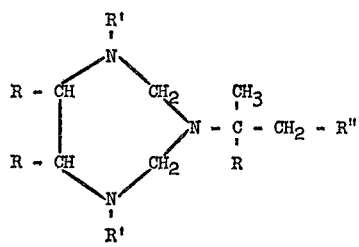

In the above and succeeding formulae in the present specification and claims, each R independently represents hydrogen or methyl; R' represents nitro, alkylsulfonyl, phenylsulfonyl, or substituted phenylsulfonyl; and R" represents phenyl or substituted phenyl with the proviso that when R' is nitro, the side chain R is methyl and R" is other than phenyl. The products of the present invention are useful as agents to control the growth of plants. In addition, these products are useful as agents to modify and control the behavior of warm blooded animals.

---

In the present specification and claims, the term "substituted phenyl," when used alone as well as when used as part of the term "substituted phenylsulfonyl," is employed to refer to a phenyl radical which is ring substituted with one substituent moiety selected from the group consisting of halo, nitro, methyl or methoxy; "alkyl," in the term "alkylsulfonyl," is employed to refer to alkyl radicals being of from 1 to 12, both inclusive, carbon atoms; and the term "halo" is employed to refer to appearances of bromine and chlorine, only.

CROSS REFERENCE TO RELATED APPLICATION

This application is a continuation-in-part of my copending application Ser. No. 602,597, filed Dec. 19, 1966, now abandoned.

DETAILED DESCRIPTION OF THE INVENTION

The products of the present invention, as defined hereinabove in the abstract, are crystalline solid materials which are somewhat soluble in many common organic solvents and of very low solubility in water. They are prepared by reacting together an ethylenediamine compound having the formula

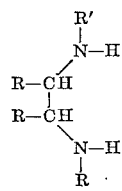

formaldehyde, and an amine having the formula

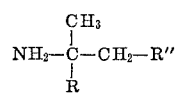

The formaldehyde can be supplied to the reaction site in any of its known forms, conveniently, for example, the 37 percent aqueous formaldehyde commonly known as Formalin, trioxane, paraformaldehyde, or formaldehyde in gaseous state.

The reaction is conveniently carried out in the presence of an inert liquid reaction medium, such as, for example, benzene, chloroform, tetrahydrofuran, and ethyl acetate. Also, where the formaldehyde reactant employed is an aqueous formaldehyde, such as Formalin, excess of such aqueous formaldehyde can be employed as inert liquid reaction medium. The amounts of the reactants to be employed are not critical, some of the desired product compound being obtained when employing the reactants in any amounts. However, the reaction consumes the reactants in amounts which represent one molecular proportion of the ethylenediamine compound, two molecular proportions of formaldehyde, and one molecular proportion of amine; the use of amounts which represent such proportions, or such proportions with a slight excess of the formaldehyde reactant, is preferred, and usually results in the production of optimum yields.

The reaction goes forward at temperatures between —15° and 100° C., and conveniently, at temperatures between 5° and 25° C., with the production of the desired product in the reaction mixture together with water as a byproduct. In carrying out the reaction, the reactants are contacted together in any convenient fashion and maintained for a period of time in the reaction temperature range to complete the reaction. Some of the desired product compound is formed immediately upon the contacting together of the reactants; however, the yield of the desired product compound is increased by permitting the reaction mixture to stand for a period of time.

The reactants can be contacted together in any order; however, it is preferred to first contact together the ethylenediamine compound and the formaldehyde. A further preferred practice in the present invention comprises heating such mixture of ethylenediamine compound and formaldehyde, in the presence of an inert liquid reaction medium, to the temperature at which the ethylenediamine compound becomes dispersed in the formaldehyde, cooling the resulting dispersed mixture to the preferred temperature range of 5° to 25° C., and adding the amine reactant to the cooled mixture.

Following the completion of the reaction, the reaction mixture can be employed for the useful purposes of the present invention; also, the desired product compound can be separated from the reaction mixture by filtration and/or the reaction medium removed by distillation or evaporation under subatmospheric pressure. As a result of such operations, the desired product compound is obtained as a residue. This residue can be used without purification or can be purified by conventional procedures, such as, for example, recrystallization, washing with inert liquid reaction medium, and the like.

The following examples illustrate the triazepine compound of the present invention but are not to be construed as limiting.

EXAMPLE 1.—HEXAHYDRO - 1,5 - DINITRO - 3- (α - METHYLPHENETHYL) - 1H - 1,3,5 - TRIAZEPINE

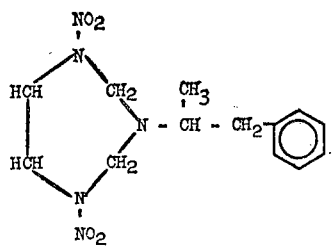

N,N'-dinitroethylenediamine (15.0 grams; 0.1 mole) and 37 percent aqueous formaldehyde (48 grams; 0.6 mole) were mixed together and the resulting mixture warmed until the N,N'-dinitroethylenediamine was completely dissolved. Thereafter, the solution was cooled to a temperature of 5° C. and 13.5 grams of d-amphetamine (0.10 mole) added portionwise to the cooled solution over a period of time. The addition resulted in the precipitation of a white solid, and 15 milliliters of water were added so that stirring and mixing could be continued. After completion of the addition, the reaction mixture was held for a period of thirty minutes. The mixture was then filtered to separate the hexahydro-1,5-dinitro-3-(α-methylphenethyl)-1H-1,3,5-triazepine product as a residue. This product residue was washed with water and dried.

The washed and dried product residue was dispersed in hot isopropanol, filtered, and the filtrate cooled. Cooling resulted in the precipitation of the product in the filtrate. It was separated by filtration, air-dried, and, after a second recrystallization from isopropanol, found to melt at 95.5–96.5° C.

EXAMPLE 2.—HEXAHYDRO - 1,5 - BIS(m - BROMOPHENYLSULFONYL) - 3 - (α - METHYLPHENETHYL)-1H-1,3,5-TRIAZEPINE

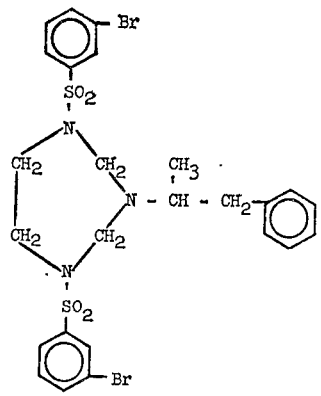

N,N' - bis(m - bromophenylsulfonyl)ethylenediamine (5.0 grams; 0.01 mole), 37 percent aqueous formaldehyde (3.3 grams; 0.04 mole), and 300 milliliters of ethyl acetate were mixed together. Thereafter, d-amphetamine (1.4 grams; 0.01 mole) was added to the first mixture. The resulting reaction mixture was heated to reflux and maintained at reflux for 5 hours. Ethyl acetate was then removed by evaporation under subatmospheric pressure to separate the desired hexahydro-1,5-bis(m-bromophenylsulfonyl) - 3 - (α - methylphenethyl) - 1H - 1,3,5-triazepine product as a yellow oil. This oil was mixed with a quantity of ethanol to crystallize the product as a white crystalline solid melting at 94.5–95.5° C.

EXAMPLE 3.—HEXAHYDRO - 1,5 - DINITRO - 3- (α,α - DIMETHYL - p - CHLOROPHENETHYL)- 1H-1,3,5-TRIAZEPINE

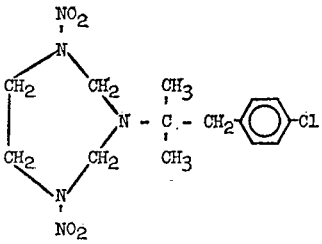

N,N'-dinitroethylenediamine (8.18 grams; 0.055 mole) and 37 percent aqueous formaldehyde (24.3 grams; 0.30 mole) were together and the resulting mixture warmed on a steam bath until the N,N'-dinitroethylenediamine was completely dissolved. Thereafter, there was added to the solution 150 milliliters of isopropyl alcohol and 10.0 grams of α,α - dimethyl - p - chlorophenethylamine (0.055 mole) dispersed in 50 milliliters of isopropyl alcohol. The latter addition was carried out proportionwise over a period of time; following the completion of the addition, the reaction mixture was heated to a temperature of 60° C. and maintained at that temperature for a period of an hour. The reaction mixture was then cooled in an ice bath; during the cooling, the desired hexahydro-1,5 - dinitro - 3 - (α,α - dimethyl - p - chlorophenethyl)-1H-1,3,5-triazepine product appeared in the reaction mixture as a precipitate which was separated by filtration. The separated product was recrystallized from ethanol, the product thus obtained melting at 161–162° C.

Other representative products of the present invention, prepared in accordance with the foregoing teachings and examples, are those identified in the following table. In this table, the symbol "M.W." is employed as an abbreviation of the term "molecular weight," and the symbol "M.P.," as an abbreviation of the term "melting point."

| | M.P. (° C.) |
|---|---|
| Hexahydro-1,5-bis(phenylsulfonyl) - 3 - (α-methylphenethyl)-1H-1,3,5-triazepine | 87.0–87.5 |
| Hexahydro - 1,5 - bis(p - methoxyphenylsulfonyl)-3-(α-methylphenethyl) - 6 - methyl-1H-1,3,5-triazepine | [1] 573.7 |
| Hexahydro-1,5-bis(p - nitrophenylsulfonyl)-3-(α-methylphenethyl) - 1H - 1,3,5-triazepine | 165.5–167.0 |
| Hexahydro-1,5-bis(hexylsulfonyl)-3-(p - methoxy-α,α-dimethylphenethyl) - 1H - 1,3,5-triazepine | [1] 559.4 |
| Hexahydro - 1,5 - bis(p - chlorophenylsulfonyl)-3-(α,α - dimethylphenethyl)-1H-1,3,5-triazepine | [1] 582.3 |
| Hexahydro-1,5-bis(methylsulfonyl)-3 - (o,α-dimethylphenethyl)-1H-1,3,5-triazepine | [1] 389.5 |
| Hexahydro-1,5-dinitro-3-(α-methyl - p - chlorophenethyl) - 6,7 - dimethyl - 1H - 1,3,5-triazepine | [1] 371.8 |
| Hexahydro-1,5-bis(methylsulfonyl) - 3 - (α-methylphenethyl)-1H-1,3,5-triazepine | 141.5–142.5 |
| Hexahydro-1,5-bis(phenylsulfonyl) - 3 - (p-bromo-α,α-dimethylphenethyl) - 1H-1,3,5-triazepine | [1] 592.6 |
| Hexahydro - 1,5 - bis(n - dodecylsulfonyl)-3-(α - methylphenethyl)-6-methyl-1H-1,3,5-triazepine | [1] 698.1 |
| Hexahydro-1,5-bis(p-tolylsulfonyl) - 3 - (α-methylphenethyl)-1H-1,3,5-triazepine | 48.0–50.5 |
| Hexahydro-1,5-dinitro-3-(m-nitro - α - methylphenethyl)-1H-1,3,5-triazepine | [1] 354.3 |
| Hexahydro - 1,5 - dinitro - 3 - (p,α-dimethylphenethyl)-1H-1,3,5-triazepine | [1] 323.1 |

[1] Molecular weight.

The products of the present invention are useful as toxicants to control the growth of plants, including higher plants such as crabgrass, wild oats, and pigweeds, as well as bacteria and fungi, such as *Bacillus subtilis, Salmonella typhosa, Staphylococcus aureus,* and *Candida pelliculosa.* The products can also be employed at lower rates to stimulate the growth of plants.

When a product of the present invention is employed for plant growth controlling purposes, the unmodified substance can be utilized. However, the present invention also encompasses the utilization of the substance together with an adjuvant. For example, the substance can be dispersed on a finely divided solid and the resulting preparation employed as a dust. Also, a product of the present invention, or a composition comprising the same and a finely divided solid, can be dispersed in water with the aid of a wetting agent and the resulting aqueous suspension employed as a spray. In other procedures, a product according to the present invention can be employed as the constituent of organic liquid compositions, oil-in-water or water-in-oil emulsions, or water dispersions, with or without the addition of a wetting, dispersing, or emulsifying agent.

In representative operations, a bacteriological culture medium containing 0.05 percent, by weight, of hexahydro-1,5-bis(m-bromophenylsulfonyl) - 3 - (α-methylphenethyl)-1H-1,3,5-triazepine gave 100 percent kill and control of *Bacillus subtilis* and *Staphylococcus aureus.* Essentially the same results were obtained with hexahydro-1,5-bis(methylsulfonyl) - 3 - (α-methylphenethyl)-1H-1,3,5-triazepine and with hexahydro-1,5-dinitro - 3 - (α-methylphenethyl)-1H-1,3,5-triazepine.

The products of the present invention are also useful as agents to be administered to warm blooded animals such as mice, rats, and dogs. In such application, the products cause a stimulation of the central nervous system, which stimulation is advantageous in the treatment of numerous conditions. These products are also useful as agents to depress the appetite of warm blooded animals in the treatment of obesity. For these various pharmaceutical applications, an unmodified product can be employed; however, the administration can also be carried out with a composition comprising the product and a pharmacologically acceptable adjuvant. When hexahydro-1,5-dinitro - 3 - (α-methylphenethyl)-1H-1,3,5-triazepine was administered to rats at a dosage of 3.0 milligrams per kilogram of individual body weight, there was observed a significant increase in behavioral output, as indicated by ability to take action to avoid application of electroshock. Pretreatment with atropine or a monoamine oxidase inhibitor potentiated the effect.

The amine reactant to be employed in the preparation of the products of the present invention can comprise an asymmetric atom. The reaction to prepare the products of the present invention does not alter the configuration of the asymmetric atom, and the amine reactant can be employed in either form or as a racemic mixture. Similarly, either or both of the carbon atoms of the ethylenediamine reactant, or the corresponding carbon atoms of the resulting triazepine product, can be asymmetric. Regardless of the configuration, however, all of the products share the useful properties of the present invention.

What is claimed is:

1. Compound of the formula

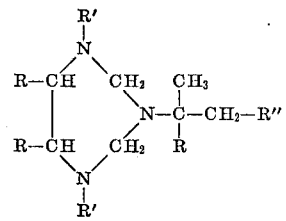

wherein each R independently represents hydrogen or methyl; R' represents nitro, alkylsulfonyl of 1 to 12 carbon atoms, phenylsulfonyl or a chloro, bromo, nitro, methyl or methoxy substituted phenylsulfonyl; and R" represents phenyl or a chloro, bromo, nitro, methyl or methoxy substituted phenyl with the proviso that when R' is nitro, the side chain R is methyl and R" is other than phenyl.

2. The compound of claim 1 wherein each ring substituent R represents hydrogen, the side chain substituent R represents methyl, R' represents (m-bromophenylsulfonyl), and R" represents phenyl.

3. The compound of claim 1 wherein each R represents hydrogen, R' represents (methylsulfonyl), and R" represents phenyl.

4. The compound of claim 1 wherein each R represents hydrogen, R' represents (phenylsulfonyl), and R" represents phenyl.

5. The compound of claim 1 wherein each ring substituent R represents hydrogen, the side chain substituent R represents methyl, R' represents nitro, and R" represents (p-chlorophenyl).

References Cited

UNITED STATES PATENTS 3,291,591   12/1966   Strycker et al. _____ 260—239

OTHER REFERENCES

Burger, Medicinal Chemistry (second edition, New York, 1960), pp. 536–537, 592–593, 615–616 (Sci. Lib).

ALTON D. ROLLINS, Primary Examiner

U.S. Cl. X.R.

71—92; 424—244